Aug. 12, 1941.                A. R. WELCH                2,252,054
                          FISHING ROD HANDLE
                         Filed Oct. 5, 1939              2 Sheets-Sheet 1
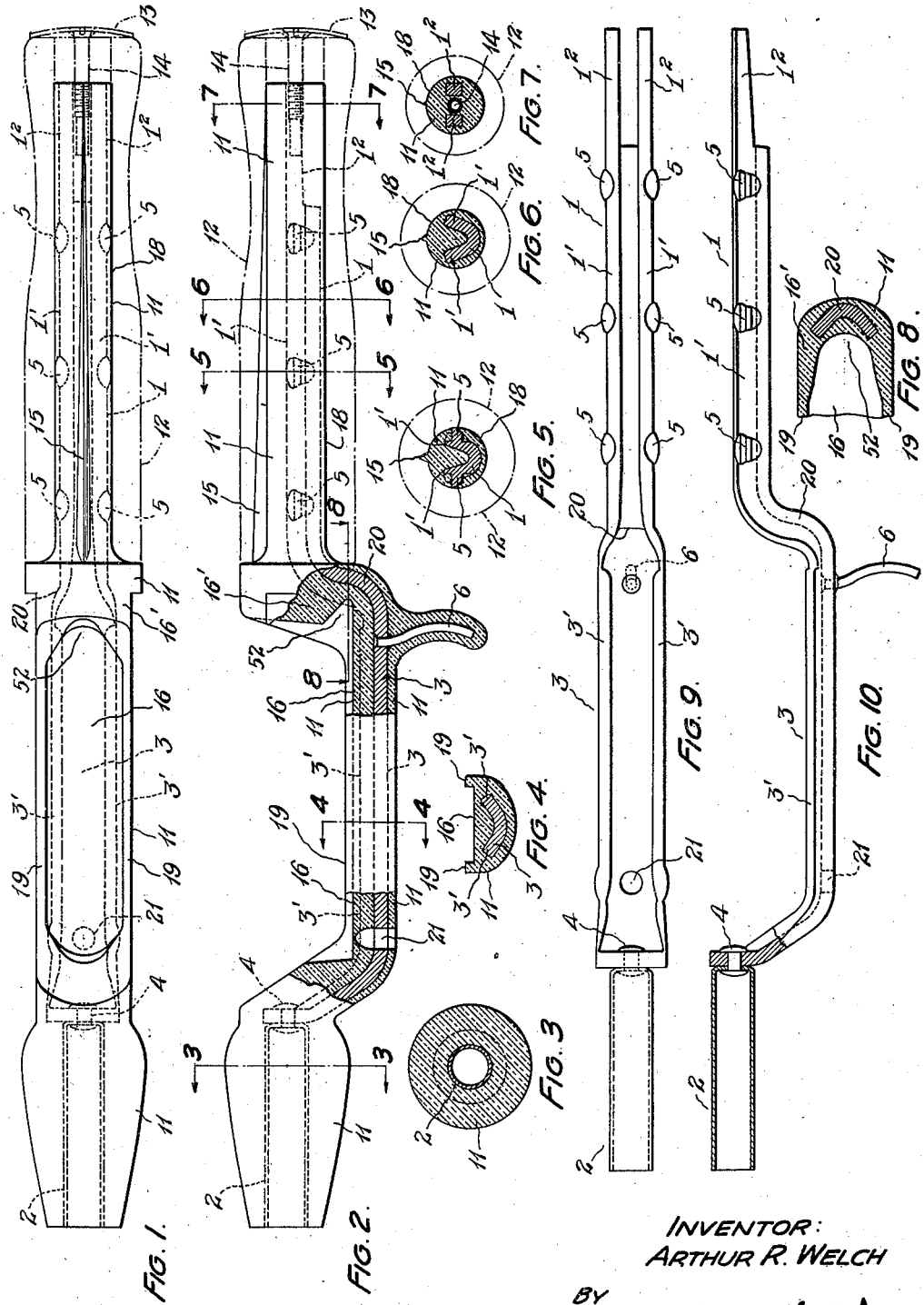
INVENTOR:
ARTHUR R. WELCH
BY
Saywell and Wesseler
ATTORNEYS.

Aug. 12, 1941.   A. R. WELCH   2,252,054
FISHING ROD HANDLE
Filed Oct. 5, 1939   2 Sheets-Sheet 2
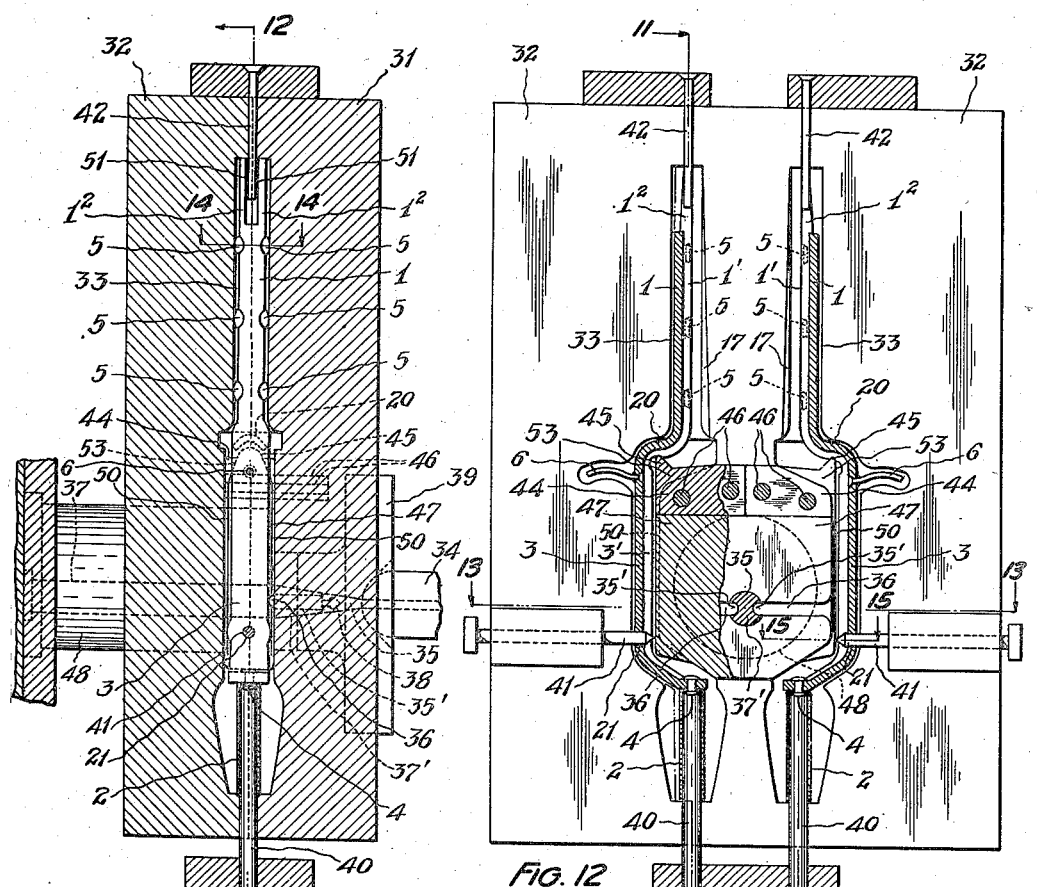
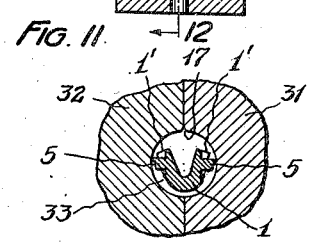
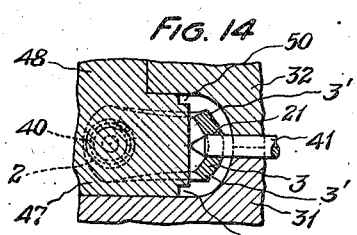
INVENTOR:
ARTHUR R. WELCH
BY
Saywell & Wesseler
ATTORNEYS Patented Aug. 12, 1941

2,252,054

UNITED STATES PATENT OFFICE 2,252,054

FISHING ROD HANDLE

Arthur R. Welch, Dover, Ohio, assignor to The American Fork & Hoe Company, Cleveland, Ohio, a corporation of Ohio Application October 5, 1939, Serial No. 298,070

7 Claims. (Cl. 43—23)

My invention relates to fishing rod handles and particularly to an improved plastic fishing rod handle having a strengthening metal insert or core. The invention also includes improved processes of making fishing rod handles. The claims of this application are limited to the improvements in fishing rod handles.

The purposes of the invention are to provide a fishing rod handle which is light and strong, a handle having simple and efficient means whereby the reel base may be secured thereto, a handle which is comfortable and easy to manipulate, and to provide a construction allowing for selective colors of handles of pleasing appearance.

The annexed drawings and the following description set forth in detail certain means illustrating the principle of my improved fishing rod handles and certain steps illustrating the method of making the same, the form of the invention herein described and shown and the methods explained being, however, respectively only one of the various forms in which the principle of the invention may be embodied and only a few of the various series of steps by which the improved method may be worked.

In said annexed drawings:

Figure 1 is a plan view of my improved fishing rod handle;

Figure 2 is a side elevation, partly in section on the longitudinal center line;

Figures 3, 4, 5, 6, and 7 are transverse sections, taken, respectively, in the planes indicated by the lines 3—3, 4—4, 5—5, 6—6, and 7—7, Figure 2;

Figure 8 is a fragmentary horizontal section, taken in the plane indicated by the line 8—8, Figure 2;

Figure 9 is a plan view of the metallic strengthening insert forming part of my improved fishing rod handle;

Figure 10 is a side elevation of the insert, partly in vertical longitudinal section;

Figure 11 is a vertical section, taken in the planes indicated by the line 11—11, Figure 12, through a mold in which a plastic housing is molded around a metallic strengthening insert to form my improved fishing rod handle, the particular mold being of a design adapted to mold two such plastic housings around two inserts to form two complete handles simultaneously, the mold being shown in closed position with two inserts mounted in the respective mold cavities;

Figure 12 is a vertical axial section, taken in the plane indicated by the line 12—12, Figure 11, certain detail being shown in elevation;

Figure 13 is a horizontal section, taken in the plane indicated by the line 13—13, Figure 12;

Figure 14 is a horizontal section, upon an enlarged scale, taken in the plane indicated by the line 14—14, Figure 11; and Figure 15 is a horizontal section, upon an enlarged scale, taken in the plane indicated by the line 15—15, Figure 12.

Referring to the annexed drawings in which the same parts are indicated by the same respective numbers in the several views, and first referring particularly to Figures 1–10, the steel strengthening insert or core of the improved handle includes an end grip reinforcing portion 1 and an intermediate depressed portion 3, the latter serving to reinforce the support upon which a reel base may be mounted, combined with an end ferrule 2 formed of brass or other suitable material, and secured by a rivet 4 to an up-turned end of the depressed portion 3, all as clearly appears in Figures 9 and 10. The grip reinforcing portion 1 and the reel support reinforcing portion 3 are of flanged construction having up-turned side portions 1' and 3', respectively, thereby forming members of a generally channel cross-section. This channel construction does not extend to the extreme free end of the grip reinforcing portion 1, but the flanges 1' at said free end terminate in a pair of spaced prongs 1² forming a fork-like terminal portion, serviceable in particular ways hereinafter fully explained. Outwardly extended from the flanges 1' and formed from the material thereof are a plurality of pairs of opposed ears 5 whose purpose will also be hereinafter fully explained. Secured in a small hole formed in the base of the reel support reinforcing portion 3, and adjacent the end thereof toward the grip reinforcing portion 1, is a small downwardly-extended reinforcing rod 6 serving as a strengthening member for the finger grip of the completed improved handle. This finger grip reinforcing member 6 may be secured in other ways, if desired, such as by spot welding or otherwise securing the same to the reel support reinforcing 3. The reel support reinforcing portion 3 is also formed with a small hole 21 therethrough which serves to receive a pin or other suitable member assisting in securing a reel base to the reel support, and also serving the purpose of assisting in centering the strengthening insert in the mold, when the plastic housing is molded thereon, all as hereinafter fully described.

The improved fishing rod handle is a composite structure consisting of the described strengthen ing insert and a plastic covering therefor. The plastic covering is indicated generally by the number "11" and clearly appears in Figures 1 and 2. To complete the handle, preferably there is mounted upon the plastic portion which covers the grip reinforcing portion 1 a cork handle grip 12 secured by a screw 14 threaded into the plastic between the terminal prongs 12 and passed through a finishing cap 13 bearing against the outer end of the cork grip portion 12. The manner of forming the plastic housing so as to provide for the convenient and secure insertion of the screw 14; also, for the convenient and secure mounting of the cork handle grip 12 upon the plastic will be hereinafter fully described.

The material from which the plastic is formed is of any suitable nature, but I preferably utilize a powder form granular in character, such as granular cellulose acetate. In a manner well known to those skilled in the art, this granular material is supplied to a hopper and thence fed into a heater and comes out therefrom in viscous form suitable for feeding into the molding apparatus. Preferably, in forming the plastic housing of my improved handle, I utilize the injection process of feeding the viscous material; i. e., injecting the viscous material through an entrance hole to the mold under pressure, and then feeding the material through spur leads into the mold cavity. However, the improved process may be satisfactorily worked by the compression type of molding.

Referring particularly to Figures 11-15, the plastic housing 11 is molded about the strengthening insert by the use of two mold parts 31 and 32, of which it will be herein considered that 31 is a fixed mold part and 32 is a movable mold part. When these mold parts 31 and 32 are in closed position, there is formed adjacent their abutting surfaces a pair of mold cavities 33, each of which is adapted to accommodate one of the steel strengthening inserts and provide space around and about the latter within which the plastic covering of desired thickness and shape can be molded. These mold cavities are formed part in the mold section 31 and part in the mold section 32. As stated, the annexed drawings and this description are directed to such a mold which will accommodate two strengthening inserts and form plastic coverings thereabout, but the number of handles so formed by one molding operation is not critical to the use of the invention and the forming of two of such handles by one such operation, as disclosed in the accompanying drawings and description, is illustrative only.

The steps involved in the process of producing the improved reinforced plastic handle are as follows:

First, with the mold parts 31 and 32 in open position, a strengthening insert is placed in that part of each mold cavity 33 formed in the mold part 32. Then the insert is properly centered and otherwise positioned by means of mold pins 40 and 41 and the outwardly-extended ears 5 formed upon the insert grip reinforcing portion 1, as hereinafter explained in detail. In applying these centering and positioning members, the mold pin 40 is first caused to enter the brass ferrule 2 of the strengthening insert, which operation is in reality a part of the operation of fitting the insert into the cavity of the mold part 32, which, being effected as shown in Figures 11 and 12, establishes the proper vertical position of the insert. This vertical positioning is then made secure by means of the mold pin 41 which is passed transversely through the hole 21 formed in the reel support reinforcing portion 3 of the insert. This pin 41 also prevents any rotation of the insert. Then an upper mold pin 42 is moved downwardly and passed in between the fork-like prongs 12 of the insert grip reinforcing portion 1. The pin 42 does not engage the opposed inner walls of the prongs 12, but there is left a small recess or space 51 between the pin 42 and the opposed inner walls of the prongs 12, as clearly appears in Figure 11, into which recess 51 plastic is forced, as hereinafter described, thus forming a plastic bound hole between the prongs 12, in the wall of which hole the screw 14 can make its own thread when utilized for securing the cork handle grip 12 which has heretofore been described. By providing the fork-like prongs 12, the plastic bound hole is thus obtained while also preserving the strengthening feature of the metal insert for the full length of the grip portion of the completed handle. After the strengthening insert has been properly positioned, as stated, the movable mold part 32 is brought into closed position with the mold part 31. That part of the mold cavity 33 within which the insert grip reinforcing portion 1 is contained is of such cross dimension that the opposed ears 5 of said insert grip reinforcing portion 1 bear against the opposed cavity walls of the mold parts 31 and 32 whereby the insert is secured in proper position laterally. The set-up is then in condition for effecting the molding of the plastic covering about the strengthening insert.

The plastic material which, as before stated, is injected into the mold in viscous form, is fed through a nozzle 34 into a frusto-conical lead or channel 35 formed in a nozzle head portion 39 of the mold part 31 and continued through the main body of the mold part 31, this channel 35 being subdivided into two branches 35' through the medium of an inner tapered portion 37' of a pin 37 mounted in the mold part 32 and extended outwardly therefrom into the channel 35. These channel or lead branches 35' are formed by side recesses in the tapered portion 37' of the pin 37. Otherwise, the pin portion 37' fits snugly in the channel 35. Each of the branches 35' opens into a laterally extending lead 36 formed in a mold head portion 47 extended outwardly from the face of the mold part 32, each lead 36 discharging into a mold cavity 33. The tapered pin portion 37' is formed into a baffle end portion 38 which provides means, because of the slight opening for passage of plastic afforded by it, for easily breaking the molded plastic when the mold part 32 is retracted after the molding operation, the molded material adjacent the baffle 38 being thin and fragile, and the plastic material inwardly thereof being more or less set whereas the plastic material which is outwardly thereof is more or less liquid, being still very hot and not having opportunity to set or form to any considerable extent.

The spaced opposed pairs of ears 5 upon the insert grip reinforcing portion 1 and the depressions formed in said portion 1 by the formation of said ears 5 constitute bonds serving to assist in securely uniting the strengthening insert and the plastic covering, and this bonding effect is enhanced by reason of the fact that the surfaces of the ears 5 and depressions are roughened during the formation of the ears 5.

A part of the molding operation consists in forming an undercut recess 52 in the plastic housing portion covering the angular portion 20 of the insert connecting the reel support reinforcing portion 3 and the grip reinforcing portion 1. To form this undercut recess 52, there is provided a small block 44 in which are mounted a pair of pins 46 loosely seated in openings formed in the mold part 31. In molding two plastic housings with one operation, the inner vertical edges of the two blocks 44 abut, as clearly shown in Figure 12. Each block 44 is formed with an upwardly-extended ear 45 at its upper outer corner, which ear 45 is disposed midway of the planes of the side walls of the block 44, as clearly appears in Figures 11 and 12. Furthermore, the ear 45 is narrower than the main body of the block 44; as also, are small triangular shaped portions 53 of said block 44 immediately below the ear 45. The pins 46 are so positioned in the mold part 31 that the ear 45 of the block 44, when the mold parts 31 and 32 are in closed position, extends adjacently to, but does not touch, the connecting portion 20 of the strengthening insert, whereby plastic is forced between the strengthening insert portion 20 and the ear 45, and is also molded around the ear 45 and the triangular portions 53, thus forming the plastic portion 16' with the undercut recess 52 therein, clearly shown in Figure 2. The fact that the pins 46 are loose in the holes in the mold part 31 permits the ready removal of the block 44, inasmuch as when the movable mold part 32 is retracted, the block 44 rides back upon the mold head 47, and when the latter is moved inwardly of the mold part 32 through the medium of a movable plunger 48, of which the mold head 47 is an integral part, the block 44 can be readily removed.

The mold cavity 33 is also so formed as to effect the molding of upwardly-extended shoulders 19, Figure 4, upon each side of the plastic covering portion 16 for the reel support reinforcing portion 3, and throughout the length of this portion 16 of the plastic covering, between which shoulders 19 and upon which plastic covering portion 16 the reel (not shown) is mounted, one end of the reel extending into the undercut recess 52 and the other end being secured by a screw passed through the insert hole 21 and through holes in the plastic portion 16 which are drilled through the plastic in the finishing operations and which are aligned with the insert hole 21. The formation of these shoulders 19 upon the plastic covering the reel support reinforcing portion 3 is effected by means of notches 50 formed in the mold head 47 adjacent its corners and extending throughout the height of the mold head 47, as clearly appears in Figures 11, 12, 13, and 15.

Furthermore, the mold cavity 33 is so formed as to provide for the molding of a tapered fin 15 outwardly extended from the plastic portion 18 covering the handle grip reinforcing portion 1, said tapered fin 15 running lengthwise of said plastic portion 18 substantially throughout its length. This fin 15 is formed by extending and shaping the mold cavity which extends around the insert grip reinforcing portion 1 in the manner indicated by the number "17", Figure 12. The purpose of the fin 15, which tapers from its inner end of maximum height and thickness to a height and cross-section substantially zero at its outer end, is to provide means which will cut a groove in the cork handle grip 12 when the latter is first applied, and thereby provide holding means which will prevent said cork handle grip 12 from turning upon the underlying plastic portion 18. After a groove has once been cut in the cork handle grip 12 by the fin 15, the handle grip 12 can be conveniently and readily replaced when removed, by aligning such groove and the fin 15 when effecting such replacement.

What I claim is:

1. In a fishing rod handle, the combination with a metallic reinforcing insert having an end grip-like portion, an opposite end portion adaptable for securing to the butt end of a fishing rod, and an intermediate portion; of a covering of plastic composition over the insert and adherently secured thereto and having a seat-like portion covering said intermediate insert portion.

2. In a fishing rod handle, the combination with a metallic reinforcing insert having an end grip-like portion, an opposite end portion adaptable for securing to the butt end of a fishing rod, and an intermediate portion; of a plastic covering around said insert portions having a seat-like portion, said plastic covering having a finger grip portion, said plastic covering also having an undercut recess in the portion thereof covering said intermediate portion of the insert and adjacent said seat-like portion.

3. In a fishing rod handle, the combination with a metallic reinforcing insert having an end grip-like portion with laterally-extended ears, said insert also having an opposite end portion adaptable for securing to the butt end of a fishing rod, and an intermediate seat-like portion; of a plastic covering around said insert portions having a finger grip portion, said plastic covering also having an undercut recess in the portion thereof covering the seat-like portion of the insert and adjacent said seat-like portion, said last-mentioned plastic covering portion having an outwardly-extended shoulder.

4. In a fishing rod handle, the combination with a metallic reinforcing insert having an end grip-like portion, an opposite end portion adaptable for securing to the butt end of a fishing rod, and an intermediate seat-like portion; of a plastic covering around said insert portions having a finger grip portion, said plastic covering also having an undercut recess adjacent one end of the portion thereof covering the seat-like portion of the insert, said plastic covering portion also having opposed longitudinal upraised shoulders between which a reel base may be mounted and extended into said undercut end recess.

5. In a fishing rod handle, the combination with a metallic reinforcing insert having an end grip-like portion, an opposite end portion adaptable for securing to the butt end of a fishing rod, and an intermediate seat-like portion, said insert also having a reinforcing rod extended downwardly from said seat-like portion; of a plastic covering around said insert portions and said rod, said plastic covering also having an undercut recess in the portion thereof covering the seat-like portion of the insert, said insert rod and its plastic covering forming a finger grip.

6. In a fishing rod handle, the combination with a metallic reinforcing insert having an end grip-like portion of generally channel cross-section, an opposite end sleeve portion, and an intermediate angular seat-like portion of generally channel cross-section; of a covering for the insert consisting of a plastic composition adherently secured thereto.

7. In a fishing rod handle, the combination of a metallic reinforcing insert having an end grip-like portion, an opposite end portion adaptable for securing to the butt end of a fishing rod, and an intermediate portion; a covering for the insert consisting of a plastic composition adherently secured thereto and having a seat-like portion covering said intermediate insert portion; and a tubular cork grip for the handle detachably mounted upon the plastic portion covering the grip-like portion of the insert, the last-mentioned plastic covering portion having a longitudinal tapered peripheral fin adapted, upon the forcing of the cork grip over said plastic covering portion, to cut a longitudinal groove in the inner wall of said cork grip.

ARTHUR R. WELCH.